UNITED STATES PATENT OFFICE.

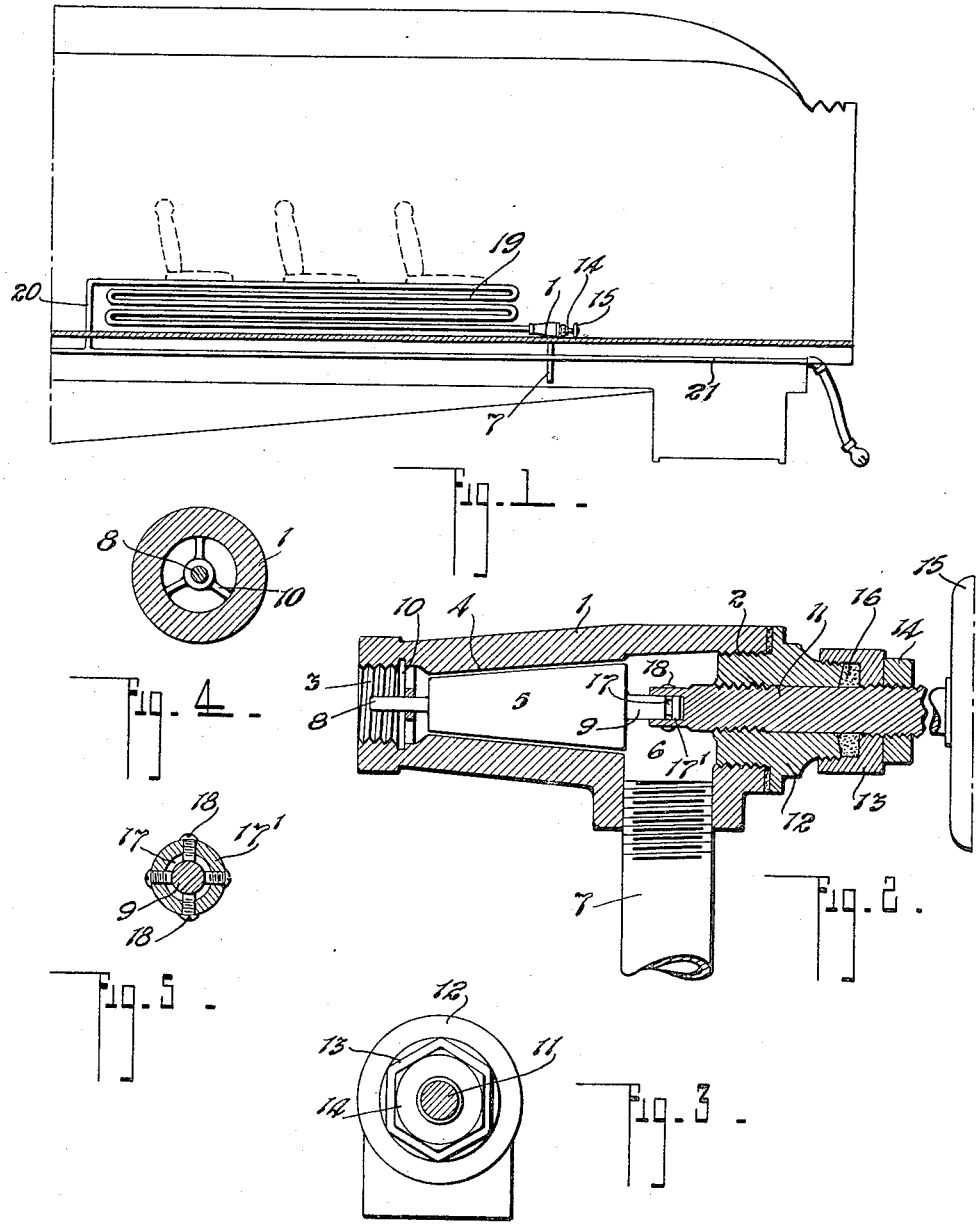

JOHN RICHARD TAYLOR, OF WINNIPEG, MANITOBA, CANADA.

GRAVITY STEAM-TRAP.

1,122,662.  Specification of Letters Patent.  Patented Dec. 29, 1914.

Application filed March 19, 1914. Serial No. 825,869.

*To all whom it may concern:*

Be it known that I, JOHN RICHARD TAYLOR, of the city of Winnipeg, in the Province of Manitoba, Canada, have invented certain new and useful Improvements in Gravity Steam-Traps, of which the following is the specification.

The invention relates to improvements in gravity steam traps especially designed for use in connection with the heating systems of railway and such like cars and the object of the invention is to provide a trap which will operate under the influences of temperature changes to effect the draining of the waters of condensation from the steam heating system and when adjusted will operate automatically and effectively.

A further object of the invention is to provide an inexpensive durably and simply constructed trap having the parts arranged so that they can be readily removed for repair or other purposes.

With the above objects in view the invention consists essentially in the arrangement and construction of parts hereinafter more particularly described and later pointed out in the appended claim, reference being had to the accompanying drawing in which:

Figure 1 represents the trap as it appears installed in a railway car heating system. Fig. 2 represents an enlarged detailed vertical sectional view through the trap detached. Fig. 3 represents an end view of the trap. Fig. 4 represents an enlarged detailed sectional view through one end of the trap showing the spider in side elevation. Fig. 5 represents an enlarged detailed sectional view through the coupling between the valve stem and adjusting rod.

In the drawing like characters of reference indicate corresponding parts in each figure.

1 represents a valve casing having the ends thereof internally screw threaded as indicated at 2 and 3. The body is slightly contracted to provide a more or less longitudinally tapering seat 4 for the conical valve 5, there being an escape chamber 6 reserved behind the valve which communicates directly with a drain pipe 7 screw threaded into the casing.

The valve 5 is formed from a material such as zinc or aluminum which is readily susceptible to temperature changes and will expand and contract quickly and to a considerable degree under small fluctuations in temperature. It is provided at opposite ends with a spindle 8 and a stem 9 these being arranged to lie in the longitudinal axis of the casing. The spindle 8 is slidably mounted in a spider 10 formed as part of the casing.

The stem 9 is connected with an adjusting rod 11 screw threaded into a boss 12 in turn threaded into the end of the valve casing. The rod projects through a cap 13 screw threaded onto the end of the boss and has the outer end threaded and receiving a lock nut 14 designed when tightened up against the cap to lock the rod in any position in which it may be adjusted by the turning of the hand wheel 15 on the outer end thereof. Suitable packing 16 is inserted in the cap.

The valve is coupled to the rod in the following way: The stem of the valve is fitted with a circumferentially directed groove 17 and it is received within a socket 17' formed in the adjoining end of the rod. Screws 18 are threaded through the wall of the socket and into the groove. This construction permits the rod to be turned and in turning to be adjusted without displacing the valve as the screws 18 will simply turn in the groove as will readily be understood.

I will now describe the manner in which the trap is connected in a steam heating system. This is shown in Fig. 1 of the drawing where the reference numeral 19 represents the heating coils of a car which coils are connected by a branch pipe 20 with the main steam pipe 21 of the car. The end 3 of the trap is screw threaded onto the lower end of the coil with the drip pipe 7 extending in a vertical manner through the car floor. When so installed the trap operates as now described:

When live steam is admitted to the main steam pipe the valve is partially open as shown in Fig. 2. The steam branches from the main pipe and travels through the coils 19 and escapes through the valve to the drain pipe, the trap being initially cold. As the live steam escaping through the trap heats the same the valve expands and closes. It will remain closed as long as the temperature is maintained sufficiently high to keep it so. It is well known however that there is considerable condensation of the steam in the coils. This condensed steam in the form of water drains down by gravity to the trap and collects at this point. The temperature of this water is obviously lower than the temperature of live steam. The moment the waters of condensation adjoining the trap have reached a temperature sufficient to contract the valve from the seat the water is freed to drain between the valve and seat and escape through the drain pipe. This action will continue until the water of condensation is practically all drained off for the reason that the valve will not again expand to close on the seat until the temperature has been raised to expand it sufficiently and this will not occur until live steam is about to escape. Accordingly when once installed the trap is entirely automatic in its operation.

The scope of the trap is entirely limited by the adjustment given the valve through the setting of the rod by the hand wheel. It will be seen that if the rod is adjusted to withdraw in the boss the valve will be drawn back so that there is initially a larger opening between the face of the valve and the seat. Accordingly the rise in temperature will have to be proportionate to close the valve on the seat through expansion of the same. Conversely by adjusting the valve to decrease this opening initially only a small expansion of the valve is required to close it.

What I claim as my invention is;

The combination with a steam pipe, of a gravity steam trap connected to the pipe and comprising a valve casing having one end connected with the lower end of the steam pipe and the opposite end fitted with a boss and having the body portion thereof formed to present an interior tapering valve seat, an expansible and contractible conical valve contained within the casing and provided at one end with an extending spindle and at the opposite end with an extending stem, a spider contained within the casing at the end adjoining the steam pipe and receiving the valve stem slidably, a rod adjustably mounted in the boss and having the inner end thereof connected through a suitble coupling with the valve stem, a hand piece secured to the outer end of the rod, a drain pipe opening to the interior of the casing at a point behind the valve and means locking the adjusting rod in any adjusted position, as and for the purpose specified.

Signed at Winnipeg this 6th day of February 1914.

JOHN RICHARD TAYLOR.

In the presence of—
G. S. ROXBAUGH,
L. GOULD.

Copies of this patent may be obtained for five cents each, by addressing the "Commissioner of Patents, Washington, D. C."